United States Patent [19]

Sump

[11] Patent Number: 5,167,076
[45] Date of Patent: Dec. 1, 1992

[54] MAP READING AND PLOTTING INSTRUMENT

[76] Inventor: Mallory L. Sump, 142 Munson Dr., Columbus, Ga. 31903

[21] Appl. No.: 612,584

[22] Filed: Nov. 9, 1990

Related U.S. Application Data

[63] Continuation-in-part of Ser. No. 312,036, Feb. 17, 1989, Pat. No. 4,969,271.

[51] Int. Cl.$^5$ .............................................. B43L 13/00
[52] U.S. Cl. ................................... 33/431; 33/471; 33/15 D
[58] Field of Search .............. 33/1 L, 1 N, 15 D, 431, 33/465, 471, 472; 235/65, 78 N, 88 N, 116

[56] References Cited

U.S. PATENT DOCUMENTS

| | | | |
|---|---|---|---|
| 905,249 | 12/1908 | Townsend | 33/470 |
| 2,003,172 | 5/1935 | Burt | 33/1 N |
| 2,039,333 | 5/1936 | Musham | 33/1 N |
| 2,477,556 | 7/1949 | Shaw | 33/15 D |
| 2,545,935 | 3/1951 | Warner | 33/431 |
| 2,996,242 | 8/1961 | Bannister | 235/78 N |
| 3,059,339 | 10/1962 | Danforth | 33/15 D |
| 3,432,927 | 3/1969 | Springer | 33/15 D |
| 3,855,706 | 12/1974 | Price | 33/431 |
| 4,359,628 | 11/1982 | Lambert | 33/431 |
| 4,625,409 | 12/1986 | Arakawa | 33/1 N |

FOREIGN PATENT DOCUMENTS 443421 12/1948 Italy ........................................ 33/471

*Primary Examiner*—Thomas B. Will
*Attorney, Agent, or Firm*—McGlew & Tuttle

[57] ABSTRACT

A map reading and plotting instrument for use with a scaled map having a declination diagram. The instrument includes a first transparent disc with a scale provided adjacent its periphery and a second transparent disc coaxially aligned with the first disc, the second disc having a cut out portion. A hollow securing element is provided connecting the first and second discs and a center of each of the discs for rotative movement independent of each other. At least one arm is provided in a flat rectangular configuration with a scale provided thereon. The arm is disposed between the first and second discs and secured to the securing element connecting the two discs and the arm for pivotal movement independent of the first and second discs. A sight-slide subassembly is provided pivotably connected to the second disc at a second disc sight-slide pivot location. The sight-slide subassembly includes a sight and slide scale of linear measure extending from a first location to a second location of the subassembly. A sight-slide connection guide arrangement is provided including tracks formed in the subassembly and a sight guide which is movable along the tracks between the first and second location for movement relative to the sight-slide scale, the sight including an opening positionable for accessing the map through the opening.

9 Claims, 8 Drawing Sheets

*Fig. 11*

MAP READING AND PLOTTING INSTRUMENT

This is a continuation-in-part application of application Ser. No. 312,036 filed Feb. 17, 1989, now U.S. Pat. No. 4,969,271.

This invention relates to calculating instruments and more particularly to a map reading and plotting instrument for maps having grid azimuths and/or a declination diagram based on the universal transverse mercator projection of the earth.

BACKGROUND OF THE INVENTION

Heretofore, known instruments for aiding in the use of maps, such as exemplified in Hotchkiss U.S. Pat. No. 4,337,577 dated Jul. 6, 1982 and Lambert, U.S. Pat. No. 4,359,628 dated Nov. 16, 1982, are very limited in their usefulness, particularly for military purposes. One such limitation is that they are applicable to a single scale map because each instrument is calibrated for use with one of several military scaled maps, as for example 1:25,000, 1:50,000 or 1:125,000. Another limitation of known instruments, particularly for military uses, is that the user has a need in the effective use of a map to make arithmetical computations and, therefore, military recruits must undergo extensive training in map reading. Some of the arithmetical computations involve converting magnetic azimuths to grid azimuths and conversion to back azimuths when it is desired to locate on the map an unknown point from two known points, which functions are referred to as "resection" and "intersection". Also, in determining the total distance along a sinuous path, e.g. a road or railroad track, the user must add the straight portions of the path between the curved portions. A further limitation of known map reading devices is that the artillery uses instruments in which angular directions are measured in mils rather than degrees for more accurate aiming of the weapons. Thus, artillery personnel and those spotting for artillery units must have special map reading and plotting instruments. Obviously, where in the use of heretofore known map reading instruments computations are required, the need for paper and/or a writing implement poses a problem, particularly under actual field conditions where paper and a writing tool is not always available to the map user. Also, map reading and plotting instruments of heretofore known types require the user to draw lines on a map and, in absence of available paper, the user may use the map for making computations. These writings on a map lead to short map life and leaves marks which even if erased, are visible or can be made visible and may give aid to an enemy if the map is captured.

SUMMARY AND OBJECTS OF THE INVENTION

These aforementioned limitations and others have been eliminated by the map reading and plotting instrument of the present invention wherein the instrument has a more universal use, automatically performs the calculations and can be used by a person having minimal training in its use. Also it is desirable, particularly for military use, that the map reading and plotting instrument be of relatively rugged construction and compactness. It should also be made of transparent material to permit map features to be seen when the instrument, in its use, is placed on the map.

Accordingly, it is an object of this invention to provide an improved map reading and plotting instrument which is capable of being used with a plurality of maps of different scale. Another object of the present invention is to provide an improved map reading and plotting instrument which is compact and sturdy and is therefore particularly useful in the military. A further object of this invention is to provide an improved map reading and plotting instrument which can be effectively used by persons having very little instructions in its use. A still further object of this invention is to provide an improved map reading and plotting instrument capable of performing a multiplicity of functions automatically.

Now therefore, the improved map reading and plotting instrument according to this invention comprises two transparent discs disposed coaxially one above the other for independent rotation and two independently pivotal arms, all of which are secured for rotative movement by a common fastener located at the center of the discs. The discs and the arms are relatively thin in thickness, for example about 1/32 of an inch or 0.079 centimeters, accordingly the arms are preferably disposed between the discs to protect the arms against accidental damage. The arms are dimensioned in length so that the distal end portion lies slightly beyond the peripheries of the discs and thereby enable the arms to be engaged by the user for pivotal movement. One of the discs has adjacent to its periphery at least one scale of angular increments while the other disc carries a first diametral line representing a north-south axis and a second diametral line extending perpendicular to the first line representing an east-west axis. Each of the arms have at least one scale of linear measure extending from the pivot point thereof to the distal end portion.

According to another aspect of this invention the improved map reading and plotting instrument is constructed and arranged for use with maps having grid azimuths and a declination diagram thereon so as to have usefulness with a broad range of scaled maps and to perform a multiplicity of functions automatically without the need of arithmetical computations. It is characterized by its simplicity and compact arrangement of component parts and a combination of elements permitting its use by relatively untrained persons in connection with a plurality of different scaled maps and to perform a multiplicity of functions.

A feature of this invention is the two pivotal arms which permits the automatic location of an unknown point from two known points identifiable on a map either of two plotting functions known as "intersection" and "resection".

Another feature of this present invention are two coextensive, parallel scales of different increments of linear measure at least one of which corresponds to the scale of the map on which it is to be used on the top disc and a slide-sight mounted on the top disc for movement coextensive with and relative to the two scales. This scale is used to measure the length of a topographical feature on a map, such as the sinuous path of a road or railroad bed by successively measure the straight portions between curved portions of the path which is accomplished by movement of the slide along successive straight portions to the point desired, the final slight position automatically providing the summation of the lengths of the straight portions as read from the appropriate scale.

According to another feature of the invention an arrangement with the two coextensive parallel scales of different increments is provided with a slider element for following of the course such as a sinuous path of a road or railroad bed to thereby maybe successive measures as discusses above. These parallel skills and slider element are provided on a slider scale member which is pivotally connected to one of the disks. In this way the entire arrangement maybe collapsed into a size which is only slightly larger than the disks themselves and measures from the pivot of the slider scale to the top of the arms when in a collapsed position.

A further object of the invention is to provide a map reading and plotting instrument which is simple in design, rugged in construction and economical to manufacture.

BRIEF DESCRIPTION OF THE DRAWINGS

The invention will be more fully understood from the following description thereof when considered in connection with the accompanying drawings wherein an embodiment of the invention is illustrated by way of example and in which.

THE DESCRIPTION OF THE PREFERRED EMBODIMENT OF THE INVENTION

Figure 1:
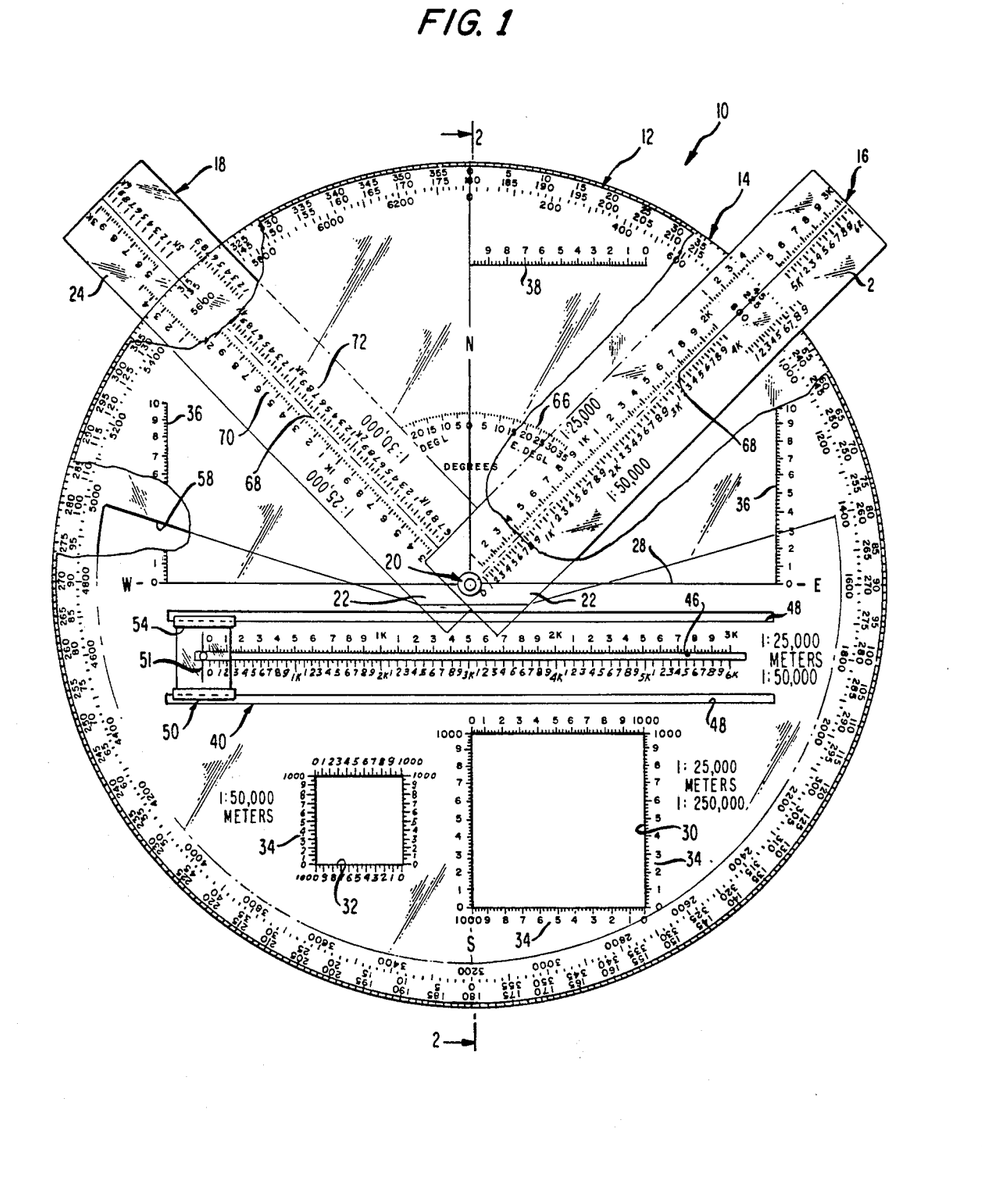
FIG. 1 is a top plan view of the improved map reading and plotting instrument according to the invention with parts broken away for illustration purposes only.
Figures 2, 5, 6, 7:
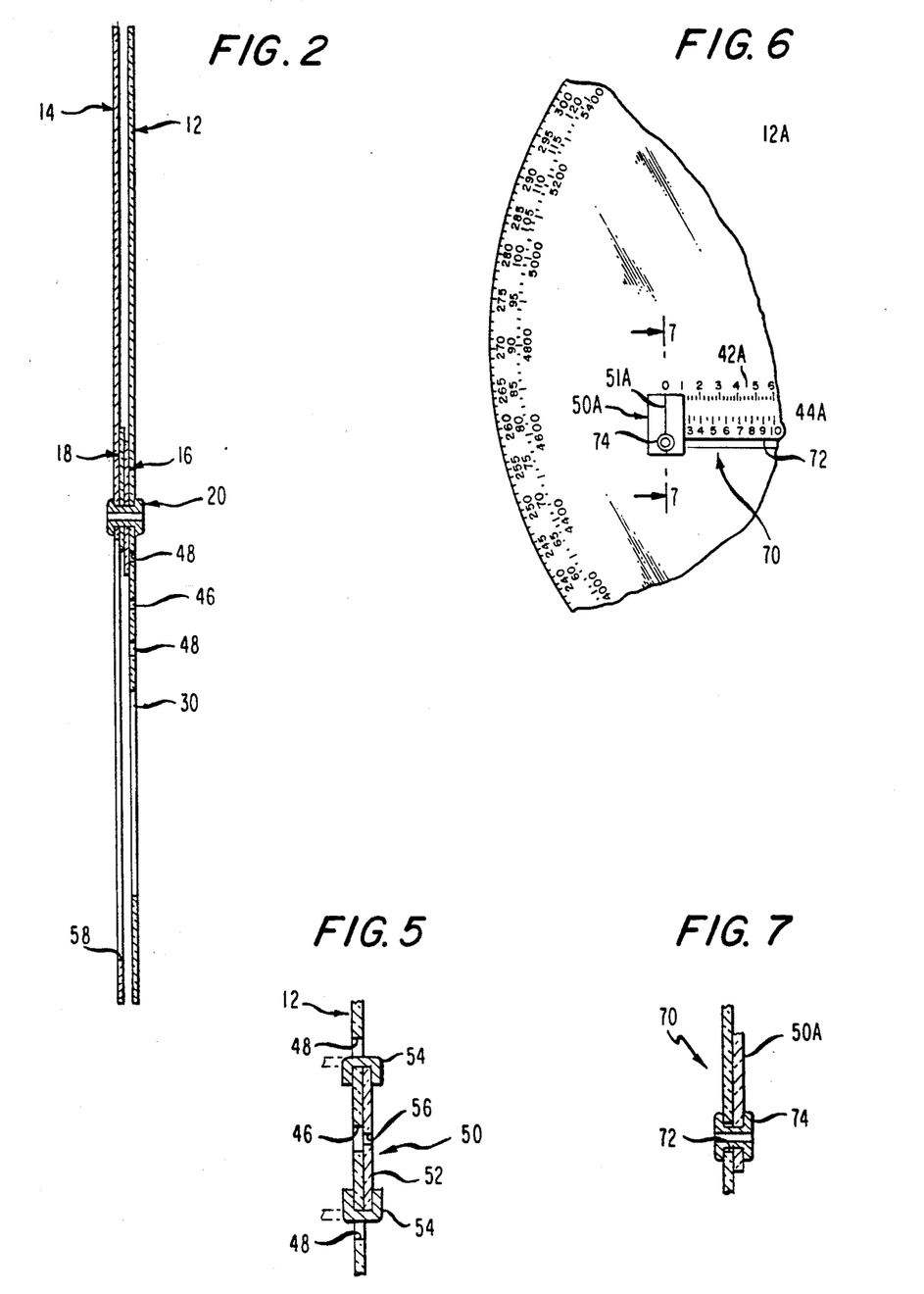
FIG. 2 is a cross sectional view taken along line 2—2 of FIG. 1.
FIG. 5 is an enlarged fragmentary, cross sectional view taken along 5—5 of FIG. 3 showing one type of a sight-slide scale subassembly according to this invention.
FIG. 6 is a fragmentary plan view of an alternative sight-slide scale subassembly.
FIG. 7 is a view in cross section taken along line 7—7 of FIG. 6, somewhat enlarged.

Now referring to the drawings and more specifically FIGS. 1 and 2, the improved map reading and plotting instrument according to this invention is generally designated by the reference number 10. The basic component parts of instrument 10 are a top disc 12 of transparent material arranged in coaxial relationship with a bottom disc 14 of transparent material and two transparent arms 16 and 18 disposed between top disc 12 and bottom disc 14 and extending radially relative to the discs. The discs 12 and 14 and arms 16 and 18 are all connected together for relative rotary movement by a hollow fastening means, as for example a hollow pin or rivet 20, as shown. The rivet 20 extends centrally of both discs 12 and 14 and through one end portion 22 of each of the arms 16 and 18 to support the arms for pivotal movement relative to each other and to discs 12 and 14. The discs 12 and 14 and arms 16 and 18 are about 1/32 of an inch or about 0.079 centimeters in thickness and are made of a transparent plastic material as for example, polycarbonate film, or plexiglass. The discs 12 and 14 are substantially the same diameter and of a size of about 7.5 inches or about 18.75 centimeters in diameter. As is shown, discs 12 and 14 are preferably of slightly different diameters to facilitate rotation of the discs relatives to each other. Top disc 12 could be made slightly smaller in diameter than bottom disc 14, about 1/32 of an inch or about 0.079 centimeters. Each of the arms 16 and 18 are dimensioned in length, as for example about 5 inches or about 7.5 centimeters, so that their respective distal end portions 24 project beyond the peripheral edges of discs 12 and 14. With end portions 24 of arms 16 and 18 lying outside the peripheral edges of the discs, a user may grasp each of the arms for relative pivotal movement with respect to each other and discs 12 and 14. At the same time since a substantial portion of each of the arms 16 and 18 lies between discs 12 and 14, the arms are shielded by the discs against inadvertent bending or breakage.

Top Disc

Figure 3:
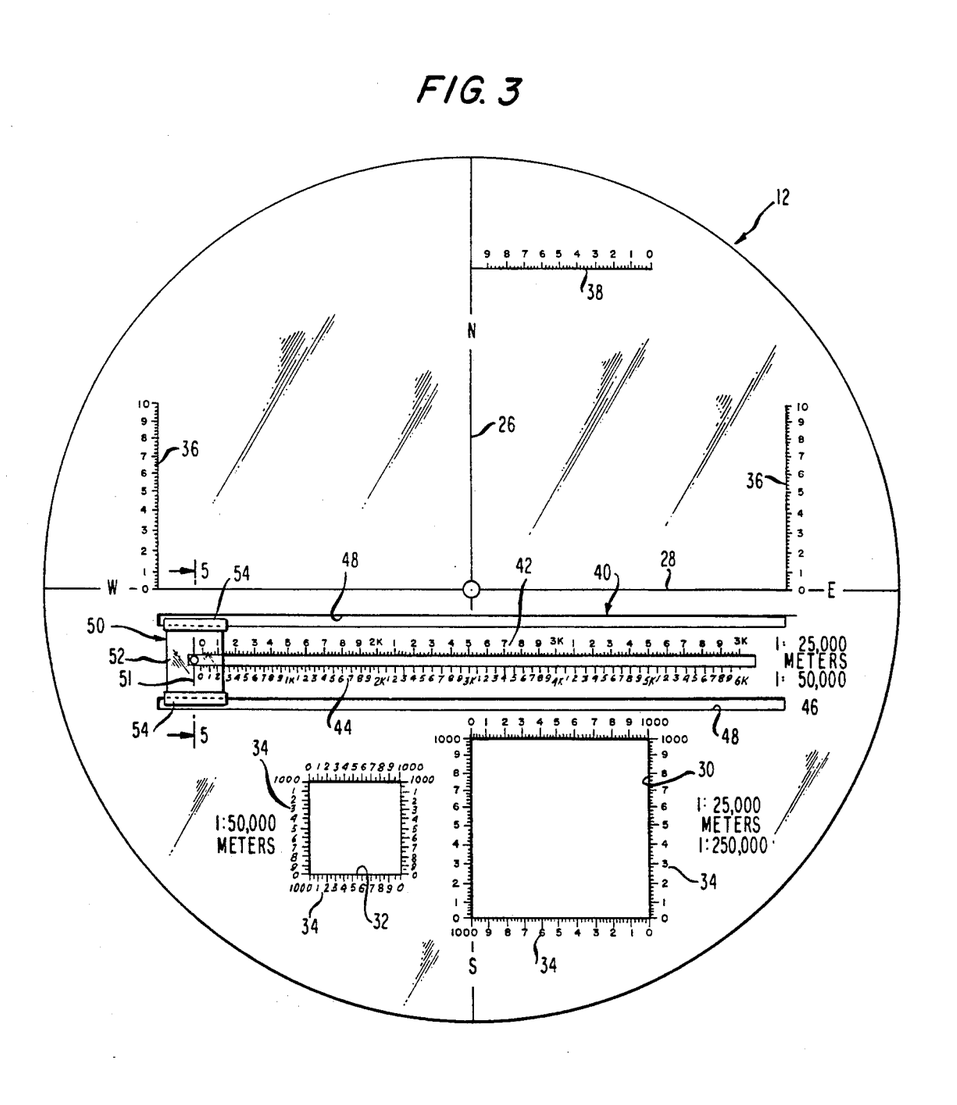
FIG. 3 is a plan view of the top disc of the improved map reading and plotting instrument shown in FIG. 1.

The top disc 12, as clearly shown in FIG. 3, comprises a north-south diametral line 26 and an east-west diametral line 28 extending normal to the north-south line 26, which permits instrument 10 to be properly orientated with respect to the north-south, east-west directions of a map, not shown. As is well known a map may have thereon a means for designating north which may be merely a line indicating magnetic north or be a declination diagram, common on military maps, showing the direction of grid north, true north and magnetic north. Also, disc 12 has two cut-out portions 30 and 32 of square shape adjacent each side of which are scales of linear measure 34 dividing each side into smaller increments, as for example into meters. Cut-out 32 and its associated scales 34 are proportioned to be useable with maps having grid azimuths thereon and of 1:50,000 scales while cut-out 30 and its associated scales 34 are proportioned for use with maps having grid azimuths thereon and of a scale of 1:25,000 and 1:250,000 ratios. This feature enables a suer of instrument 10 to more precisely identify a place on a map in terms of subdivisions of grid azimuths and communicate this to someone else. In addition, top disc 12 has two scales of linear measure 36 which extend perpendicularly from east-west diametral line 28, and, of course, parallel to the north-south diametral line 26 for measuring the distance from the east-west diametral line 28 to the nearest east-west grid line on a map. Similarly, a linear scale 38 extending perpendicularly from the north-south diametral line 26 and parallel to the east-west diametral line 28 is useable for measuring the distance from the north-south diametral line 26 to the nearest north-south grid line on a map. The scale 34 adjacent one side of cut-out 30 and, which extends parallel to scale 38, can be used for the same purpose as scale 38. One more component of top disc 12 is a sight-slide scales subassembly 40.

Sight-Slide Subassembly

The sight-slide scale subassembly 40 according to one embodiment comprises, as best shown in FIGS. 1 and 5, two linear scales 42 and 44 of different increments of linear measure which are disposed adjacent to the opposite sides of a slot 46. The scale 42, as shown is in kilometers for maps scaled to a ratio of 1:25,000 while scale 44 is in kilometers for maps scaled to a ratio of 1:50,000. Adjacent each of the scales 42 and 44 is a slot 48. These slots extend parallel to and are slightly larger in length than scales 42 and 44 and slot 46. A sight-slide 50 is constructed and arranged for slidable movement relative to scales 42 and slot 46. The sight-slide 50 comprises a transparent, flat plate 52 attached at opposite ends to brackets 54 and disposed to lie flat against the face of top disc 12. When attached to disc 12, each of the brackets 54 is U-shaped in cross section (see FIG. 5). The brackets 54 prior to attachment are L-shaped so that, in the assembly process, one leg of each of the brackets (partially shown in phantom lines in FIG. 5) is passed through a slot 48 and then bent to engage the face of top disc 12 opposite from its face engaged by plate 52. Thus, brackets 54 snugly embrace top disc 12 adjacent slots 48 but not so tightly as to prevent easy slidable movement of sight-slide 50 in slots 48 relative to scales 42 and 44. A hole 56 is provided in plate 52 in register with slot 46. The sight-slide 50 has a sight-line 51 which extends parallel to increment markings of scales 42 and 44 and through the center of hole 56. This hole 56 serves to allow an implement, as for example, a pencil, pen or leg of a pair of dividers to be inserted to effect movement of sight-slide 50 relative to scales 42 and 44 and/or to place a mark or marks on the map. To facilitate the aforementioned marking of a map and to marking a map in connection with other uses of instrument 10, as for example, using grid subdivision cut-outs 30 and 32, bottom disc 14 is provided with a large cut-out portion 58.

Bottom Disc

Figure 4:
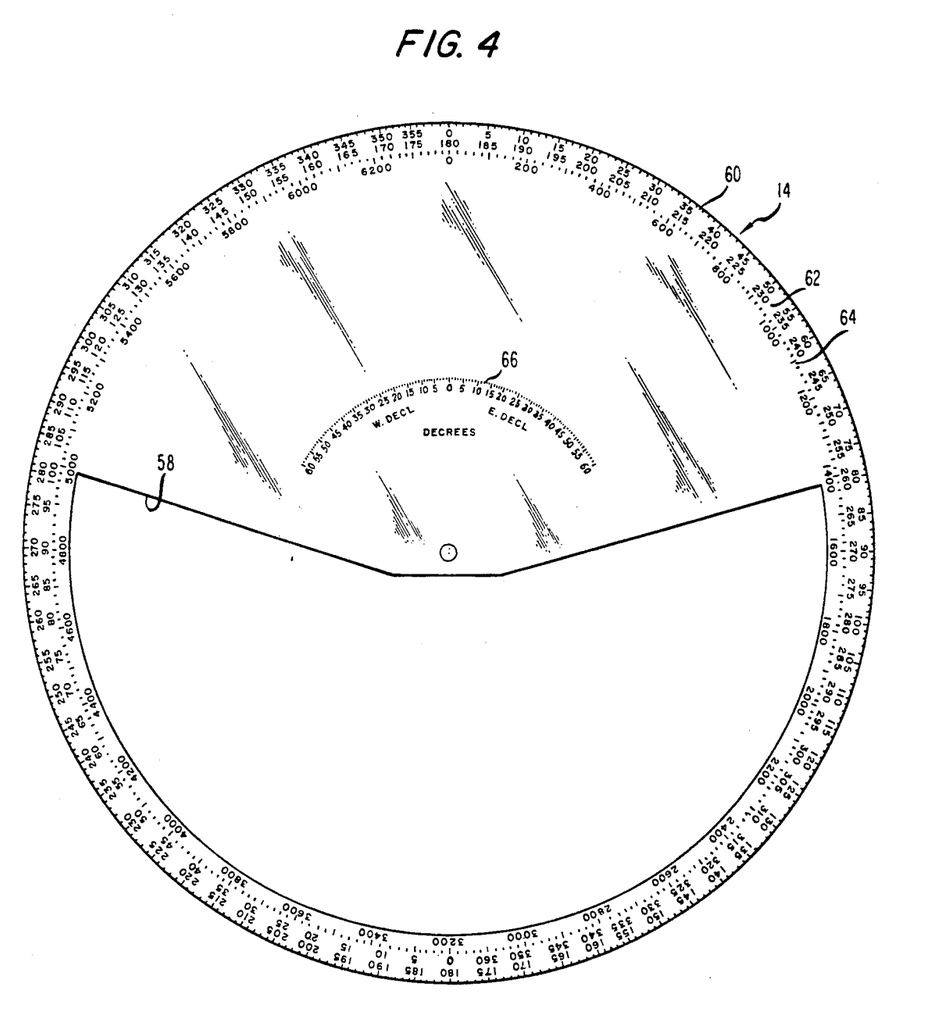
FIG. 4 is a plan view of the bottom disc of improved map reading and plotting instrument shown in FIG. 1.
Figure 8:
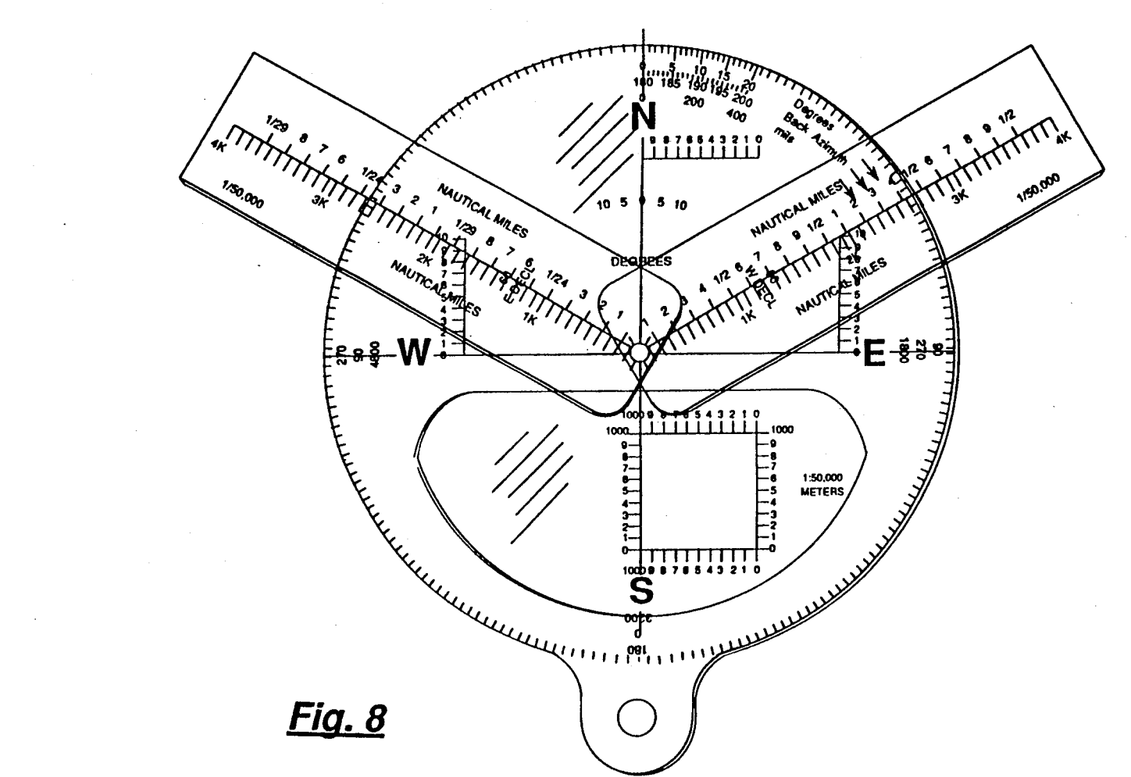
FIG. 8 is a top plan view of still another embodiment of the reading and plotting instrument according to the invention.
Figure 9:
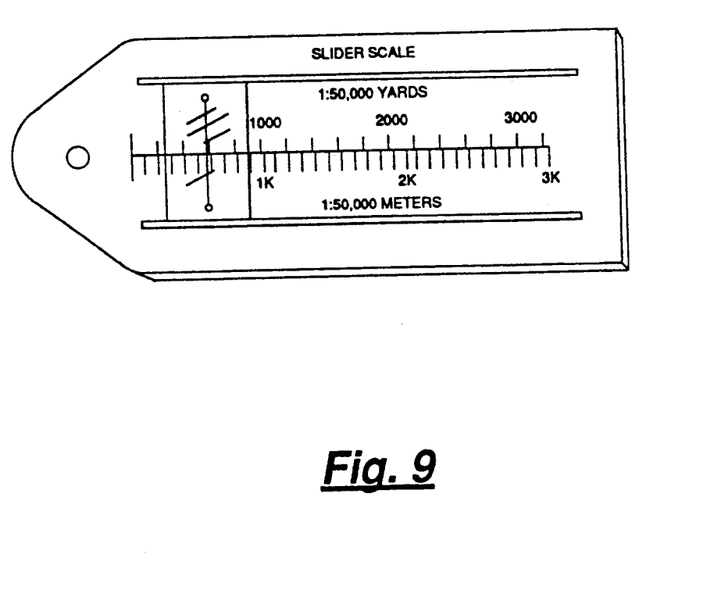
FIG. 9 is a top plan view of a slider scale arrangement according to the embodiment of FIG. 8.
Figure 10:
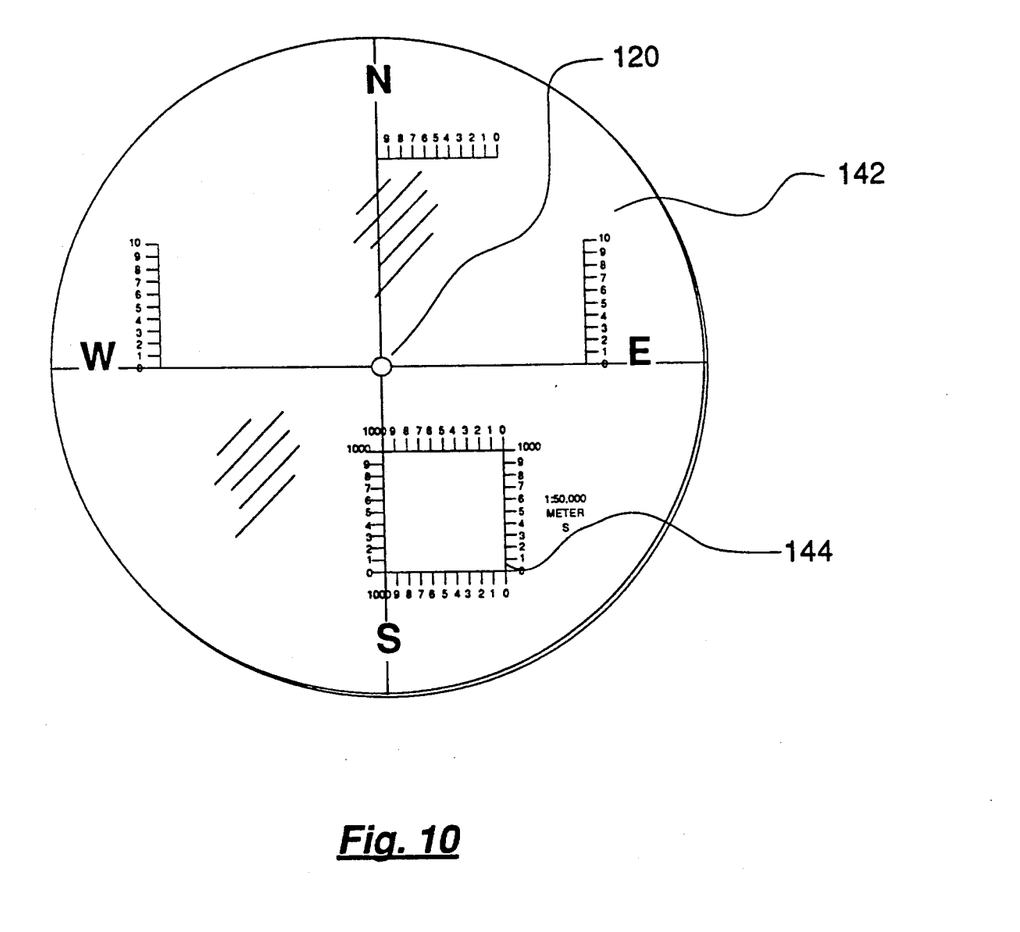
FIG. 10 is a top plan view of an upper disk according to the embodiment of FIG. 8.
Figure 11:
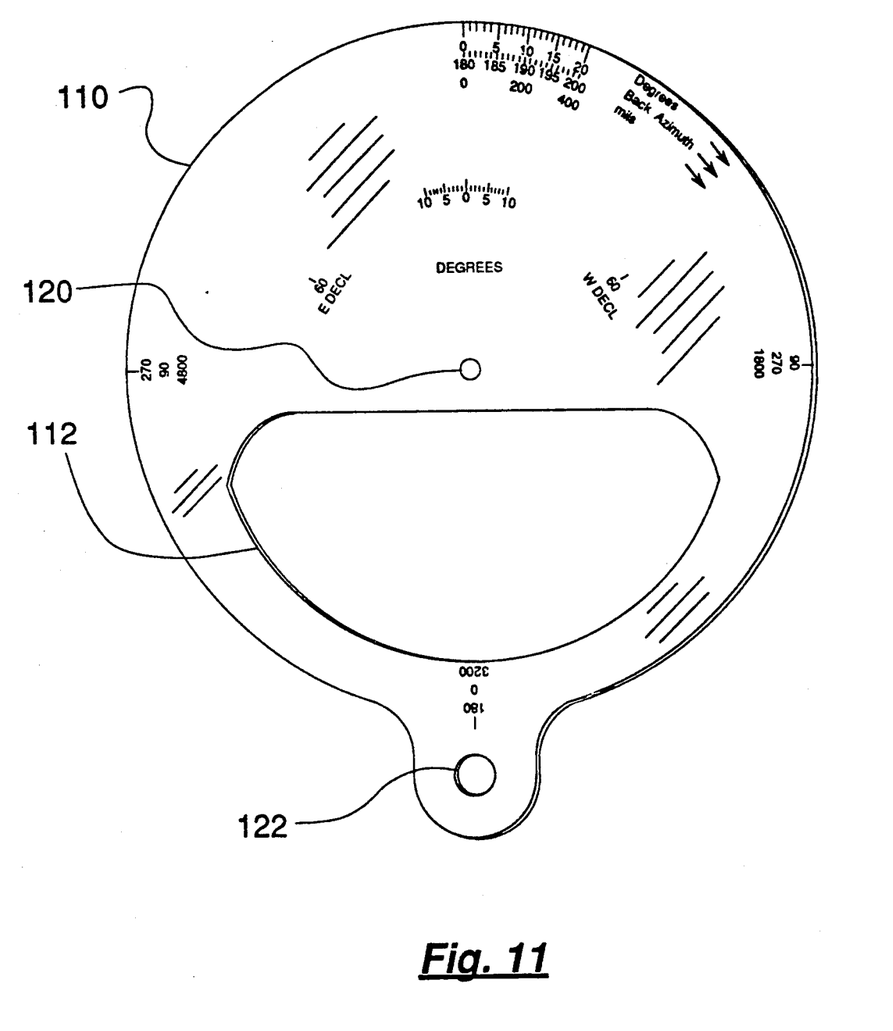
FIG. 11 is a top plan view of the bottom disk of the embodiment shown in FIG. 8.

The bottom disc 14 as is best shown in FIG. 4 has, in addition to the cut-out portion 58, three scales 60, 62 and 64 adjacent the periphery of the disc. Each of the scales 60, 62 and 64 are increments of angular measure. The scale 60 consists of angular increments in degrees while scale 62 provides the degrees of back azimuth corresponding to the degree markings of scale 60. Thus, the user of instrument 10 need not add or subtract 180 degrees from the degrees of scale 60 to obtain degrees of back azimuth. The scale 64 is a mil scale which divides the circle or 360 degrees into 6400 mils. This scale 64 more precisely divides a circle and is, therefore, used by the artillery to enable more accurate directed artillery fire. In addition, bottom discs 14 has a declination scale 66 consisting of two equal segments extending from 0 degrees to 60 degrees on either side of the north-south diametral line 26 (see FIG. 1). The declination scale 66 is important in that it permits instrument 10 to be orientated to a map having a declination diagram (not shown) which indicates the angular different between true north, magnetic north and grid north. It must be understood that the angular difference between the three north directions vary from location to location on the earth and hence from map to map to a maximum of 60 degrees. Therefore, the instrument 10 has to be orientated to the map being used. To orientate instrument 10 to a particular map in use, top disc 12 is rotated so that north-south diametral line 26 is placed on the appropriate each or west declination degree of scale 66 as indicated on the map and bottom disc 14 is then relative to top disc 12 so that 0 degrees on scale 60 coincides with the north-south diametral line 26. Once this is accomplished and instrument 10 is placed on the map where the user is located and in alignment with map grid lines (not shown) the instrument 10 automatically provides magnetic compass headings to other points on the map and back azimuth readings from those points by reading scales 60 and 62. If the direction is to be defined in mils then the user can read from mil scale 64. To assist the user in making such magnetic or mil scale readings, each of the arms 16 and 18 is provided with a longitudinally extending sight-slide 68.

Pivotal Arm

In FIG. 1 it is clear that arms 16 and 18 are identical and, therefore, only arm 16 will be described in detail. The arm 16 is flat, rectangular shaped member made from transparent material. Arm 16, in addition to sight-line 68, has at least one linear scale, but, as shown, has preferably two scales 70 and 7 of linear measure, as for example, in metric increments so that linear distances can be measured in terms of metric measure on maps of 1:25,000, 1:50,000 and 1:250,000 scale, the basic scales of maps for military use. Thus, instrument 10 can provide the user, as aforesaid, the magnetic heading and back azimuth readings to a point on a map as well as the straight line distance to that point as read from scale 70 or 72 of arm 16. This function is commonly referred to as a "polar plot".

The instrument 10 by use of arms 16 and 18 is capable of locating an unknown point on a map automatically by two processes known in the art as "resection" and "intersection". The technique of resection is employed to determine the users location on a map, when unknown, from two other known points which can be visually identified on the ground from the users location. This is accomplished by first adjusting the instrument to magnetic north as required by the declination diagram on the map to be used. Thereafter positioning the instrument 10 on the map with one arm 16 or 18 pivotally moved so that sight-line 68 thereon intersects one of the known points and the magnetic compass direction shown on scale 60 for that point. Similarly, the other arm 16 or 18 is pivotally moved to the magnetic compass direction as shown on scale 60 to that other known point so that its sight-line 68 intersects that magnetic compass reading and the known point. Where the two sight-lines 68 of the respective arms 16 and 18 intersect or resect, namely the center of rivet 20, is the location of the unknown pint on the map, the coordinates thereof being readable from the back azimuth scale 62. Obviously, the location of this unknown point is achieved automatically without arithmetical computations involving computations to back azimuths, declinations computations, etc. The technique of intersection again employs the use of arms 16 and 18 and is for obtaining the coordinates of an unknown point on a map when the users position is known and another point on the map is known and visually identifiable from the ground. The instrument 10, after adjustment for magnetic declination, is placed with the hollow rivet 20 centered on the unknown point as shown on the map which is in use (not shown) and orientated with the grid lines of the map. As before, one of the arms 16 or 18 is pivotally moved to align its sight-line 68 to intersect the corresponding back azimuth of the magnetic compass reading as shown on scale 62 and the known point or location of the user on the map. The other arm is then pivotally moved so that its sight-line 68 intersects one of the magnetic coordinates of the other known point as shown on scale 60. Where sight-lines 68 intersect scale 60 are the magnetic direction coordinates of such unknown point without the necessity for mathematically converting magnetic azimuth to back azimuth and the mathematics of computing a resection.

Alternative Sight-Slide Subassembly

In FIGS. 6 and 7 is shown an alternative sight-slide subassembly 70 and basically differs from sight-slide subassembly 40 shown in FIG. 1, in that i has only one elongated slot 72 rather than the three slots 46 and 48 of the embodiment of FIG. 1. Accordingly, the parts of subassembly 70, corresponding to like parts of subassembly 40, will be designated by the same reference number but with a suffix A added thereto.

The sight-slide subassembly 70, in addition to single slot 72 comprises sight-slide 50A and linear scales 42A and 44A, identical to scales 42 and 44 of subassembly 40, but with both scales 42A and 44A disposed adjacent one side of slot 72 and extending parallel to the latter. The sight-slide 50A comprises a rectangular flat, transparent slide plate 52A which is secured to a hollow rivet 74. The sight-slide 50A has a sight-line 51A which extends longitudinally through the center of rivet 74. The rivet 74 extends through slot 72 and is deformed or upset against the undersurface of top disc 12A to hold the sight-slide 50A to top disc 12A. The deformation of rivet 74 is such that sight-slide 50A is firmly held to top disc 12A but is free to be moved relative to top disc 12A with slot 72 serving to guide the sight-slide 52A in such movement.

The sight-slide subassemblies 40 and 70 each function to provide the user of instrument 10, with the ability to measure the distance along a sinuous path shown on a map, as for example, a road, stream, railroad bed and the like. This is accomplished by placing instrument 10 on the map so that sight-slide 40 or 79 is placed with hold 56 or the hollow core of 74 of the associated sight-slide 51 or 51A and placing such hole at the starting point on the sinuous path of the distance to be measured and the zero mark of the appropriate scale 42 or 44A. Thereafter, moving sight-slide 40 or 70 along a first straight portion of this path to be measured. Then, repositioning the sight-slide as aforesaid to the next straight portion of the path and moving the sight-slide to the end of the next straight portion. These steps are followed for successive straight portions until the sight-slide is moved to the end of the last straight portion of the distance to be measured. These successive steps of indexing the sight-slide automatically provides the user with a summation of the straight portions of the distance along a sinuous path being measured by observing where sight-slide 51 or 51A crosses the appropriate scale 42, 42A or 44, or 44A. To the summation of the straight portions an estimate of the distance along the curved portions can be added to provide the total distance of the sinuous path measured.

It is believed now apparent to those skilled in the art that the present invention provides an improved map reading and plotting instrument which is useful in connection with a plurality of different scaled maps. It is an instrument for carrying out a multiplicity of map reading and plotting functions automatically and with a minimum of arithmetic computations. It is also an instrument which is capable of use with a minimum of training. It is further characterized by its relative simplicity of design, rugged construction, the compact arrangement and assembly of its component parts, and the exceptional facility with which it can be operated and applied to a multiplicity of map reading and plotting purposes.

Referring to FIGS. 8, 9, 10 and 11 in particular, a modified form of the invention comprises a base disk 110 (see FIG. 10) which is substantially similar to the bottom disk 14 disclosed in FIG. 1. Preferably, the disk 110 is of reduced size and includes a smaller cutout 112 which extends below the pivot point 120. An additional pivot 122 is provided for connection with the slider scale arrangement, generally designated 130. The slider scale arrangement 130 includes a slide element 132 which can be connected to a slider scale base 134 in a manner similar to the embodiments described above. The slider scale base 134 preferably includes parallel tracks 136 which are similar to the tracks 48 described with regard to the embodiment of FIG. 1. Additionally, an opening 138 is provided which is substantially similar to the opening 46 described in the embodiment of FIG. 1 above. In a manner similar to the above described embodiments, a pencil or other pointed implement may be inserted into the hole or opening 140 of the slider element 132 and the slider scale arrangement 130, particularly the base 134, can be moved to follow the contour of a sinuous roadway or the like on a map such that the final position of the slider element 132 relative to the scales adjacent slot 138 provides an indication of the total distance along the sinuous path.

According to the invention a top disk 142 including a cut out portion 144 is provided pivotally connected by pivot 120 to the bottom disk 110. In a manner similar to the embodiment of FIG. 1, arms 146 and 148 are provided pivotally connected to the two disks and sandwich between the top disk 142 and the base disk 110 (see FIG. 8). According to this preferred form of the invention the
slider scale arrangement 134 pivotally connected at pivot 122 through pivot hole 122' may be pivoted back around underneath the disk arrangement so as to form a more compact arrangement which can fit into a pocket or even fit underneath the helmet of a soldier in the field.

Although three embodiments of the invention have been illustrated and described in detail, it is to be expressly understood that the invention is not limited thereto. Various changes can be made in the arrangement of parts without departing from the spirit and scope of the invention as the same will now be understood by those skilled in the art. As for example, linear scales 42, 44, 42A 44A while shown and described and as being metric linear measures may be in English linear measures, if so desired, without departure from the scope and spirit of this invention.

What is claimed is:

1. A map reading and plotting instrument for use with a scaled map having a declination diagram comprising:
   a) a first transparent disc having adjacent its periphery at least one first scale means dividing the periphery into increments of angular measure;
   b) a second transparent disc coaxially aligned with said first disc, said second disc being disposed on the bottom of said first disc, said second disc including a cut out portion;
   c) said second disc having a north-south diameter line to orientate the instrument with respect to either true north, magnetic north or grid north of the map;
   d) a hollow securing means for connecting together said first and second discs at their respective centers for rotative movement independent of each other;
   e) at least one arm of flat, rectangular configuration and having at least one second scale means consisting of increments of linear measure corresponding to the scale of the map;

f) said arm being disposed between said first and second discs and secured adjacent one end thereof to said hollow securing means for pivotal movement independent of the first and second discs; and, g) a sight-slide subassembly pivotably connected to said second disk at a second disk site-slide pivot location, said sight-slide subassembly including a sight and slide scale of linear measure extending from a first location of said subassembly to a second spaced-away second location, sight-slide connection and guide means including tracks formed in said subassembly and a sight guided by said tracks along a guide path between said first and second location for movement relative to said sight-slide scale, said sight including an opening positionable for accessing said map through said opening.

2. The device of claim 1 wherein said one first scale means includes three concentric scales one in degrees, another in degrees of back azimuths, and the other in mils.

3. The device of claim 1 wherein said arm is of a length so that its distal end projects beyond the peripheral edges of said first and second discs to facilitate its being grasped by the user for pivotal movement.

4. The device of claim 1 wherein a second arm is provided and secured for pivotal movement at its one end portion to said hollow pivot means and wherein said wherein said second arm includes arm scale means.

5. The device of claim 4 wherein each of said second scale means and said arm scale consists of two scales of linear measure proportional to map scales of 1:25,000, 1:50,000 and 1:250,000.

6. The device of claim 4 wherein each of said arms are of a length so that the distal end thereof extends beyond the peripheral edges of said discs.

7. The device according to claim 1, wherein said sight-slide scale has a plurality of linear scales corresponding to a plurality of map scales.

8. A map reading and plotting instrument for use with scaled maps having grid azimuth and a declination diagram comprising:

a) a first and second transparent disc coaxially disposed adjacent each other, said second disc being disposed on the bottom of said first disc, said second disc including a cut out portion;

b) a hollow means for securing together said first and second discs for rotative movement relative to each other;

c) two transparent, flat, elongated arms connected to said first and second discs and each secured to said hollow securing means for a pivotal movement independent of each other and said first and second discs;

d) said second disc having three first scales of angular increments disposed adjacent the peripheral edge of said second discs;

e) each of said arms having two second scales of linear measure corresponding to the said map scales;

f) each of said two second scales of linear measure extending radially from said hollow securing means; and g) said first disc having a north-south diametral line extending through the center thereof to orientate the map reading and plotting instrument with one of said scaled maps;

h) a square scale cutout defined by said first disc, said square scale cutout being positionable over said cut out portion for accessing said map through said second disc cutout portion;

i) a sight slide subassembly pivotably mounted to said second disc, said subassembly defining a track running substantially parallel to two co-extensive scales of linear measure corresponding to different map scales, said two co-extensive scales extending from a first location to a second location on said subassembly; and sight means movable along said track.

9. The map and plotting instrument for use with scaled maps of 1:25,000, 1:50,000 and 1:250,000 each of which have grid azimuths and a declination diagram, comprising:

a) a top and bottom transparent disc coaxially disposed adjacent each other, said second disc being disposed on the bottom of said first disc, said second disc including a cut out portion;

b) each of the top and bottom discs having a flat planar surfaces and being of about 0.079 centimeters in thickness;

c) two flat, rectangular, transparent arms disposed radially relative to said top and bottom discs;

d) a hollow pivot post extending centrally of the top and bottom discs and through one end portion of each of the two arms to secure the top and bottom discs and arms together for independent rotation of the top and bottom discs and pivotal movement of the arms independently of each other and the top and bottom discs;

e) each of said arms being dimensioned in length so that the distal end lies beyond the periphery of the top and bottom discs;

f) said top disc having a north-south diametral line extending through the center thereof;

g) said bottom disc having three first scales of angular increments disposed concentrically adjacent the peripheral edge of said top disc and having a declination scale;

h) each of said arms having two second scales of linear measure;

i) a sight-slide subassembly pivotably connected to said second disc, having two co-extensive scales of linear measure corresponding to different map scales, said two co-extensive scales extending from a first location to a second location on said subassembly;

j) a sight slide mounted to said subassembly along a track defined by said subassembly, said track running substantially parallel to said two co-extensive scales.

* * * * *